US008375429B2

(12) United States Patent
Mondal (10) Patent No.: US 8,375,429 B2
(45) Date of Patent: Feb. 12, 2013

(54) NETWORK-BASED APPLICATION CONTROL (75) Inventor: Joy Mondal, Asansol (IN)

(73) Assignee: Novell, Inc., Provo, UT (US)

( * ) Notice: Subject to any disclaimer, the term of this patent is extended or adjusted under 35 U.S.C. 154(b) by 792 days.

(21) Appl. No.: 12/421,213

(22) Filed: Apr. 9, 2009

(65) Prior Publication Data

US 2010/0263036 A1 Oct. 14, 2010

(51) Int. Cl.
G06F 21/00 (2006.01)

(52) U.S. Cl. ............... 726/8; 726/5; 726/2; 726/21

(58) Field of Classification Search .............. 726/8, 2, 726/21
See application file for complete search history.

(56) References Cited

U.S. PATENT DOCUMENTS

| 6,243,816 | B1 * | 6/2001 | Fang et al. ................. 726/5 |
| 6,496,511 | B1 * | 12/2002 | Wang et al. ................ 370/401 |
| 7,263,663 | B2 * | 8/2007 | Ballard et al. ............. 715/762 |
| 7,350,229 | B1 * | 3/2008 | Lander ........................ 726/8 |
| 7,603,555 | B2 * | 10/2009 | Schmidt et al. ............. 713/168 |
| 7,979,494 | B1 * | 7/2011 | Golovin et al. ............. 709/206 |
| 2002/0078386 | A1 * | 6/2002 | Bones et al. ............... 713/202 |
| 2002/0083208 | A1 * | 6/2002 | Abdelnur .................. 709/310 |
| 2003/0074239 | A1 * | 4/2003 | Hoffman et al. ............. 705/7 |
| 2004/0264474 | A1 * | 12/2004 | Sbida .................... 370/395.5 |
| 2005/0149898 | A1 * | 7/2005 | Hakewill et al. ............ 716/18 |
| 2005/0154887 | A1 * | 7/2005 | Birk et al. ................. 713/168 |
| 2006/0195893 | A1 * | 8/2006 | Caceres et al. ............... 726/8 |
| 2007/0224970 | A1 * | 9/2007 | Bang et al. ............... 455/411 |
| 2008/0092215 | A1 | 4/2008 | Soukup et al. |
| 2009/0049531 | A1 | 2/2009 | Norman et al. |
| 2009/0292814 | A1 * | 11/2009 | Ting et al. ................. 709/229 |
| 2009/0327397 | A1 * | 12/2009 | Chen et al. ................ 709/202 |

OTHER PUBLICATIONS

Espacenet search result, Espacenet Result List, Jul. 2011.*
SANS, Considerations for implementing single sign on within the enterprise, Sep. 2003.*
Yevgeniy et al, Web services: Role Based Access Control with Single Sign on Architecture, Feb. 2008.*
Somchart et al, Muti-Application Authentication based on Multi-Agent System, May 2007.*

* cited by examiner

Primary Examiner — Jung Kim
Assistant Examiner — Shan Elahi
(74) Attorney, Agent, or Firm — Schwegman, Lundberg & Woessner, P.A.

(57) ABSTRACT

Apparatus, systems, and methods may operate to send, from a central manager to one or more target machines, an access request associated with at least one application selected from a plurality of applications on the target machines, the access request identifying the target machines, the applications, and access customization code corresponding to the applications; and to send access customization code and a script corresponding to the applications from a central repository to the target machines when the customization code is not resident on the target machines. Further activities may include loading the access customization code as a library on the target machines linked to the applications and replaying recorded user intention input according to a script to supply the input to objects associated with the applications to access and otherwise control the applications. Additional apparatus, systems, and methods are disclosed.

22 Claims, 4 Drawing Sheets

NETWORK-BASED APPLICATION CONTROL

BACKGROUND

Implementing Single Sign On (SSO) operations, such as when the same operator seeks validated access to multiple applications, can help reduce the overhead of credential management at the user level and at the organization level. While SSO credential storage options are available to help facilitate login activity to some applications, others will not operate in this manner unless they are rewritten. In addition, it can be useful to automate access to multiple applications with respect to remote management, testing, and customization by system administrators.

SUMMARY

In various embodiments, apparatus, systems, and methods that support network-based application control without re-writing the applications are provided. For example, in some embodiments, control is accomplished by receiving from a central manager, at a target machine, access requests associated with one or more applications on the target machine; retrieving access customization code corresponding to the applications from a central repository when the customization code is not resident on the target machine; loading the access customization code as a library on the target machine linked to the applications; and replaying recorded user intention input according to a script to supply the input and to access the applications.

In some embodiments, operations may include sending, from a central manager to one or more target machines, an access request associated with one or more applications selected from a plurality of applications on the target machine, the access request identifying the target machine, the applications, and access customization code corresponding to the applications; and sending the access customization code and scripts corresponding to the applications from a central repository to the target machine when the customization code is not resident on the target machine. Additional embodiments are described, and along with the foregoing examples, will be set forth in detail below.

DETAILED DESCRIPTION

As an example of the difficulties described in the Background section, one may consider the popular Linux® operating system (OS). GNOME (GNU Network Object Model Environment) is a widely used Linux® desktop environment that can be built on top of the GTK (i.e., the Linux® general image manipulation program (GIMP) toolkit) framework. Since there is no standard available to remotely control or enable GNOME GUI (graphical user interface) applications for SSO operation, such activities are normally not undertaken unless the applications are rewritten to accommodate them.

These challenges may be addressed by implementing a mechanism to access the applications externally, so that there is no need to rewrite them. For example, when application access requests are received by GNOME GUI applications, a detection module can be installed in the system to intercept and process each request accordingly, to enable SSO and remote control operations. This same approach may be applied to other types of applications as well. In this way, access to applications on a variety of platforms can be achieved independently of any specific credential store.

Another difficulty, that of determining user intent, can also be addressed. Some applications track user actions with respect to a particular GTK application based on the display coordinates of the activity. For example, the movement of the cursor is tracked and coordinate values are stored as recorded data that signifies user interaction with the application. Unfortunately, any realignment of the application on the display device defeats replay mechanisms based on the recorded data.

To overcome this particular obstacle in various embodiments, the intention of the user, rather than each of his specific actions, is captured. For example, consider the entry of a password. The user's intention is to enter a complete and accurate rendition of the password, which might be presented when a "submit" button is activated. However, the actions leading up to presentation of the completed password entry may include several incorrect keystrokes, backspace key entries, etc. Thus, it can be more effective to capture the intention of the user, rather than the actions taken to achieve a particular goal (e.g., the goal of authenticating to a particular application). One way to do this is to dynamically load/inject customization code into the application's address space at runtime. In this way, access to the application's runtime memory is achieved, and a script (e.g., a set of instructions separate from the application) can access the internal components of the application to capture appropriate intention data. The recorded intention can then be replayed, such as when the same user logs into the same application at a later time, to enable SSO activity.

Thus, once an access request is received by the detection module, customization code can be retrieved from a central repository and injected into the application. The following activities may be involved in some embodiments:

- accessing applications remotely without modifying application code;
- remote injection of custom code into applications;
- dynamic code injection responsive to the request;
- central management of code injection and application control;
- capturing application data entered as the user intention, rather than activity; and
- replaying the user intention when the application is re-launched to provide SSO capability.

Since recording and replay operations do not depend on screen coordinates, application re-alignment does not affect recording or playback.

It should be noted that, while many embodiments herein are described with respect to the Linux® OS and the GTK desktop environment, this has been done for reasons of clarity, so as not to obscure various aspects of the invention. Thus, the various embodiments are not to be so limited.

For the purposes of this document, the term "central manager" refers to a network node, remote from a target machine, that can issue application access requests to the target machine.

The term "central repository" refers to a storage device that can be used to store customization code and scripts used to replay recorded user intentions. The central repository may be configured to operate exclusively under control of the central manager in some embodiments.

The term "intention" means a complete, accurate, and unambiguous set of data that indicate an intent to achieve a particular goal. For example, a complete set of username and password data field values provided to an application can be used as the intention of the user to log into that application.

The term "target machine" refers to a network node, remote from the central manager, that hosts applications and receives access requests from the central manager. Access requests can include designations of: the target machine, the application to be accessed, and access customization code, among other information.

In some embodiments, these principles are applied to network-based remote control and SSO operations as they are implemented for GTK-based applications. This implementation will now be discussed in more detail as an example embodiment.

GTK+ Applications comprise GTKWindows and GTK-widgets. When a GTK+ application is launched, the main GTKWindow is constructed and then GTKWidgets associated with the window are constructed and displayed.

GTK internally maintains a tree of all the objects (e.g., GTKWidgets) created for an application. In some embodiments, access to the tree is gained via calls to the customization code to intelligently maintain meta information regarding various GUI elements of the application. This widget meta information can be used to capture the intention of the user for replay at a later time to implement SSO operations.

Thus, a request to access and otherwise control an application can be sent from a central manager to a number of target systems where the target application is present. Upon receiving the request, an agent (e.g., a detection module) present in each of the target systems can operate to fetch the customization code and script corresponding to the applications from a central repository. The code can then be injected into the applications to access the internal structure of the tree. Using the internal structure of the application, as embodied by the tree, the script can be executed to achieve the intended user action by replaying the recorded intention without modifying the application itself.

The central manager can be used to generate access requests. A user management console may be coupled to the central manager, perhaps to accept commands that initiate the access requests to be generated, and to view reports of target machine activity. The console may also be used to:
  add target machines to the framework that receives the requests;
  add target application definitions to the central manager;
  create scripts for the target applications, to be executed in response to the requests; and
  store application definitions, custom code, and scripts in a central repository.

A request may contain any number of fields, including those that identify the origination machine, the target machine(s), the target application, the customization code, and the script. The request may also serve as an inquiry to generate status data in a reply from the agent residing on the target system.

An agent (e.g., detection module) may reside on each target machine that is added to the access framework to be controlled by the central manager. For example, the agent can operate to listen on a pre-configured TCP (transmission control protocol) port for the request from the central manager. Upon receipt of the request, the detection module (or some other process) can operate to:
  process the request to determine the content of its elements;
  retrieve target application details from the central repository based on the application identity;
  retrieve custom code details from the central repository and check the target machine to determine whether the code is already resident—if not, to fetch the code and store it locally in the target machine;
  set one or more environment variables (e.g., the GTK_MODULES environment variable for a GTK application, or the LD_PRELOAD variable in the Solaris™ OS) so that the customization code is loaded ahead of other libraries;
  retrieve the script from the central repository (if needed) based on the script identity;
  restart the target application to load the customization code as a library ahead of other libraries for the target application; and
  return the status of the application and/or target system to the central manager, while maintaining an activity history.

The central repository many contain a number of elements, including:
  IP (internet protocol) address/host name of the target machines in the control framework;
  target applications details, such as: a unique identifier for the target application, the target application name, the target application's executable name and path, information related to the fields in the application for which entry will be automated, and the corresponding script identifier; and
  script details, such as a unique identifier for the script, and script text.

Customization code can be injected into an application as part of a library loading process. For example, GTK+ supports the environment variable GTK_MODULES to specify the list of arbitrary dynamic modules to be loaded and executed when GTK+ is initialized. It is somewhat similar to the LD_PRELOAD environment variable used in the Solaris™ OS. Thus, when an application is launched/executed, the dynamic libraries against which the application is linked are loaded into memory. This information is incorporated into the executable at the time of linking when the application is built.

Using the GTK_MODULES environment variable, any library that is specified can be dynamically loaded when GTK+ is initialized during the launch of a related application. In a specified library, a custom implementation of the gtk_module_init( ) function can be written and poked into the application (since the dynamically-loaded library is also able to access the same memory address space as the application) and can access the information of the application structure at run time. In this way, the main event processing loop in the application can be intercepted to undertake specified actions when a selected event occurs (e.g., an access request is received).

Using a GTK API (application interface), the object or widget tree of the application can be accessed to name each application window in a unique way. Then, each of the widgets within the window can be obtained and named uniquely within its own window. In this way, each widget can be uniquely identified by a combination of the application identity, the window identity, and the widget identity. When an application is launched, a widget picker application can be launched automatically to pick up the widgets to be tracked and populated for SSO operations. The widget picker can use the unique widget identification to identify specific widgets in any application. The widget picker can also be used to obtain information about the widgets needed for writing scripts to automate the replay of user intentions.

If the script already exists for an application and the credentials are not currently stored, this means that an application is being launched for the first time with respect to a particular user. In this case, the user can be prompted as to whether he wants to implement SSO capability, or not. If the user chooses to do so, a pop-up dialog can be presented for user interaction, to record the user intention that can later be used to populate the values of widgets in the application tree, as defined in the script. The widget identifiers can be placed in the script so that the widgets can be located at a later time (when the script is executed) and appropriate action taken based on the commands in the script.

Thereafter, when the same user launches the same application, the agent on the target machine can operate to search for the script corresponding to the application, and the widgets of interest in the application can be filled with the values obtained from the credential directory/cache so that appropriate action is taken based on the script. As a result, various embodiments permit accessing and controlling applications remotely, without modifying application code.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 1:
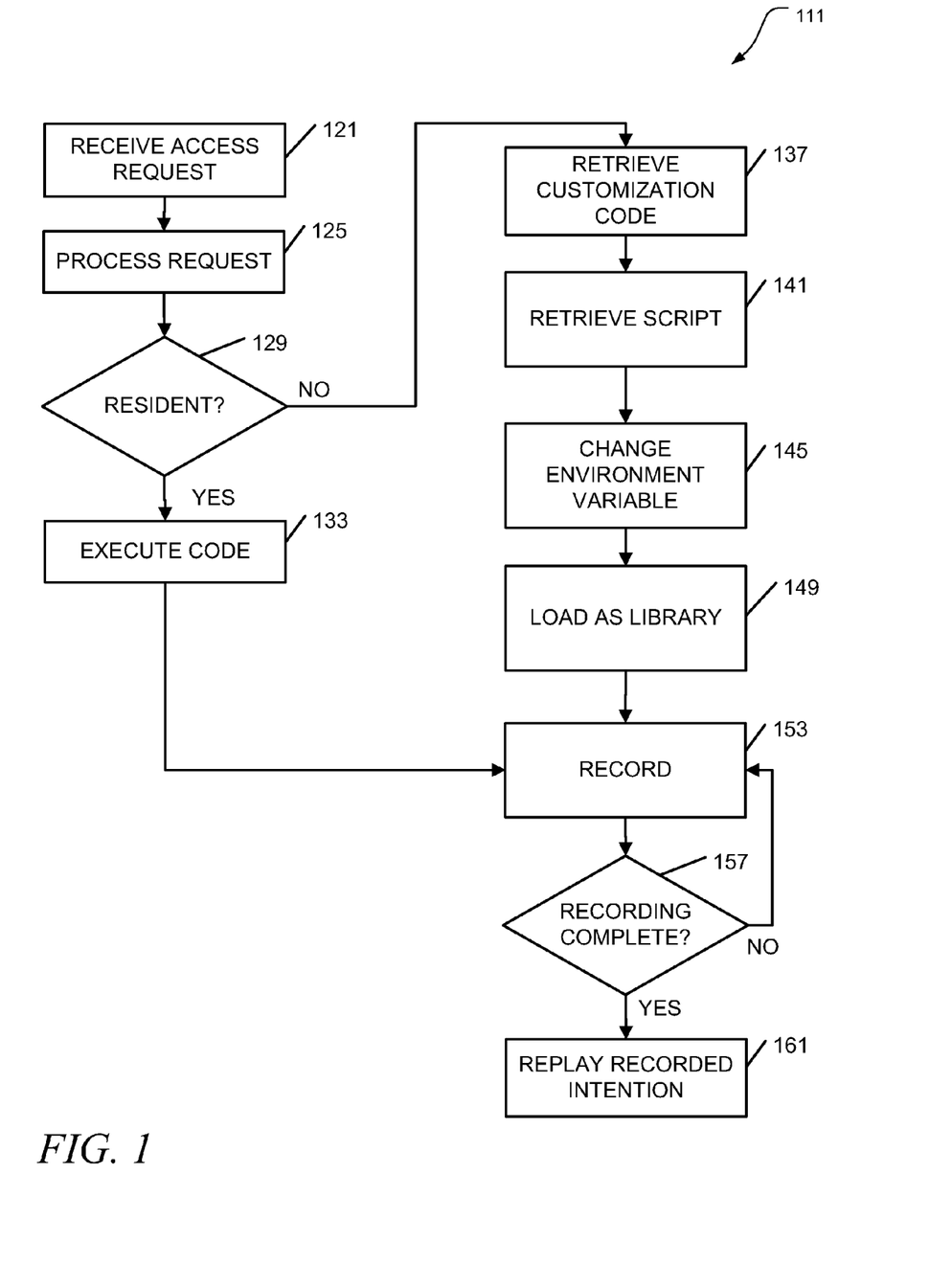
FIG. 1 is a flow diagram illustrating methods of network-based application control according to various embodiments of the invention.

FIG. 1 is a flow diagram illustrating methods 111 of network-based application control according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when accessed by a specific machine, perform the processing depicted in FIG. 1. Given this context, network-based application control is now discussed with reference to FIG. 1.

In some embodiments, as viewed from the perspective of a target machine, a processor-implemented method 111 that can be executed on one or more processors that perform the method may operate to receive a request, retrieve and load access customization code, and retrieve a script that is used to replay user intention input to change object (e.g., widget) values associated with an application to provide automated control of the application. Thus, the method 111 may begin at block 121, with receiving from a central manager, at a target machine, an access request associated with an application selected from a plurality of applications on the target machine.

The access request can provide a variety of information, including the identity of the central manager, the target machine, the application, the access customization code, the script, etc. Thus, the method 111 may comprise, at block 125, processing the access request to determine the identity of at least one of the target machine, the application, the access customization code, or the script, among others.

It should be noted that the access request can identify a group of applications, each with its own access customization code and script, instead of just a single application. Thus, the access request may operate to identify a subset of a plurality of applications in some cases.

Once the access customization code has been retrieved by the target machine, it can be executed whenever an access request is received. Thus, the method 111 may go on to block 129 to determine whether the customization code and/or script are resident on the target machine. If so, then the method 111 may continue on to block 133 with executing the access customization code on the target machine in response to receiving the access request when the customization code is resident on the target machine. Otherwise, the method 111 may continue on to block 137 with retrieving the access customization code corresponding to the application from a central repository when the customization code is not resident on the target machine.

The script can be kept at the central repository, along with the access customization code. Thus, the method 111 may continue on to block 141 with retrieving the script corresponding to the application from the central repository.

An environment variable (e.g., GTK_MODULES) can be changed on the target machine to provide preferred execution of the customization code by the application. Thus, for example, the access customization code can be given preferential use by the application if the application's library loading order is changed. Therefore, the method 111 may comprise, at block 145, changing an environment variable on the target machine so that execution of the access customization code preempts execution of other library code on the target machine.

The method 111 may go on to include, at block 149, loading the access customization code as a library on the target machine linked to the application. Preferential access to the customization code can then be implemented by restarting the application to load the libraries in a selected order, perhaps to give preference to execution of the access customization code over other code. Thus, the activity at block 149 may comprise restarting the application to load the access customization code according to the selected library loading order (e.g., as specified in the environment variable).

If SSO access has not been enabled, the user intention input can be recorded for future automated access (e.g., via replaying the user intention input). Thus, the method 111 may comprise, at block 153, recording the user intention input when SSO access has not been previously enabled for the application.

The access request can initiate recording activities on the target machine, so that the central manager can verify compliance with the request at some later time. Thus, the activity at block 153 may further comprise recording activities on the target machine associated with executing the application to create a history of activities associated with the application in response to receiving the access request.

The method 111 may continue on to block 157 to determine whether the intention and/or activity recording is complete. If not, the method 111 may include looping back to block 153 to record additional information. For example, one indication that recording of the user intention is complete might be detecting depression of the "ENTER" key after a username and password entry have been made. Thus, the user intention input may comprise a username and password.

Once the user intention has been completely recorded, the method 111 may continue on to block 161 with replaying the recorded user intention input according to a script to supply the input to objects associated with the application to access the application. Such objects may include widgets having values that are populated with user intention input data according to the script, giving control of the application. Thus, the activity at block 161 may include populating widget values associated with the application using a script to enable SSO access to the application. Other embodiments may be realized.

Figure 2:
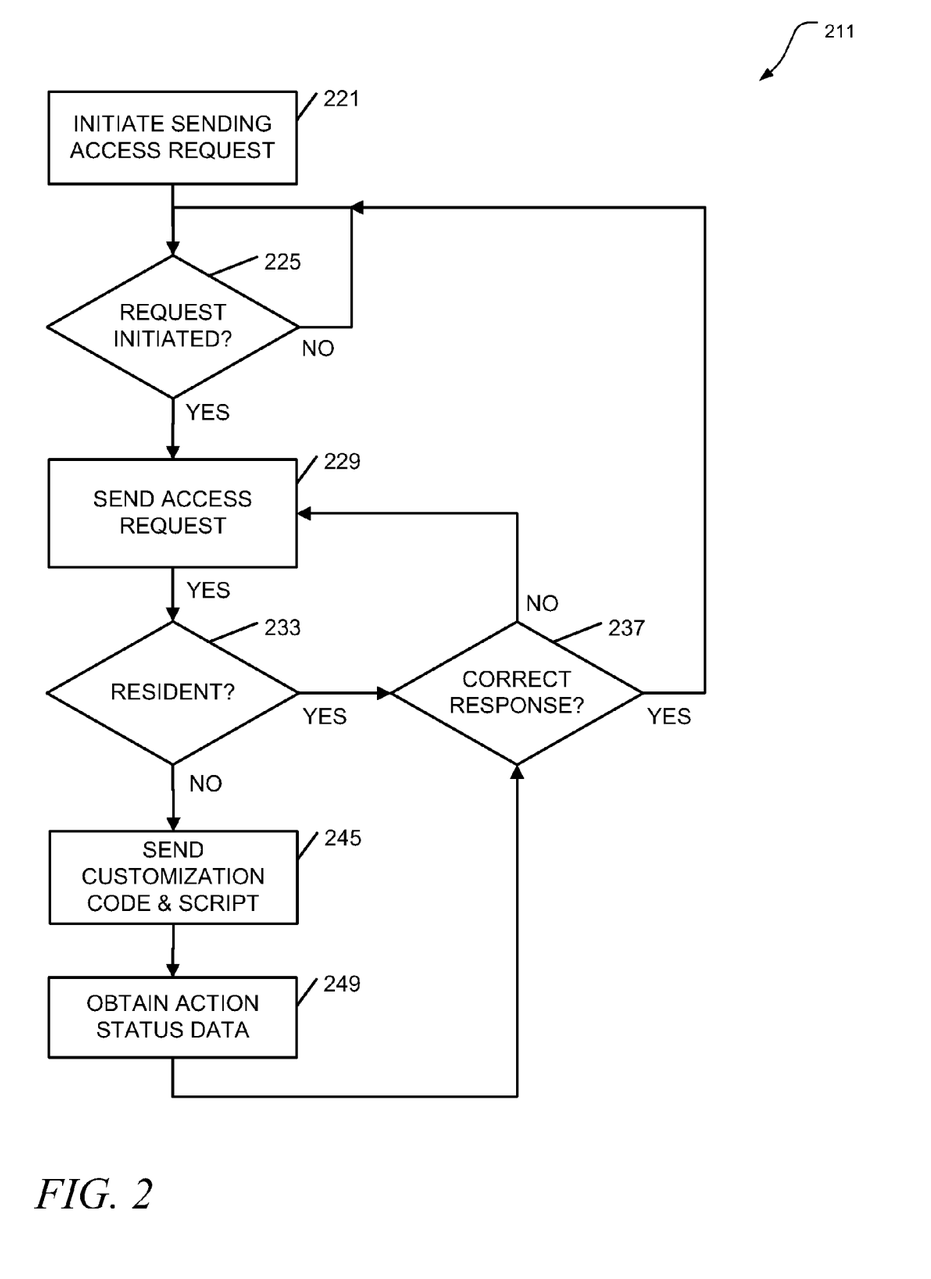
FIG. 2 is another flow diagram illustrating methods of network-based application control according to various embodiments of the invention.

For example, FIG. 2 is another flow diagram illustrating methods 211 of network-based application control according to various embodiments of the invention. In this case, the methods 211 focus on the activities of the central manager and repository. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Thus, in some embodiments, a processor-implemented method 211 that can be executed on one or more processors that perform the method may comprise sending an access request to the target machine, and then sending access customization code and the related script to the target machine (when they are not already resident on the machine).

To begin, it should be noted that a system administrator or another entity operating the central manager can initiate sending an access request to one or more target machines. For example, a system administrator may specifically request remote control of multiple target machines, via the access request. Thus, the method 211 may begin at block 221 with initiating the sending of an access request in response to detecting a system administrator entry at the central manager. For example, the system administrator entry may comprise an automated test entry to remotely control one or more target machines.

The method 211 may go on to include determining, at block 225, whether the access request has been initiated. If not, then the method 211 may loop back to block 225 to continue checking for the initiation of a request. Otherwise, the method 211 may continue on to block 229 with sending, from the central manager to at least one target machine, an access request associated with an application (perhaps selected from a plurality of applications) on the target machine(s), the access request identifying the target machine, the application, and access customization code corresponding to the application. In some embodiments, the application may comprise a widget-based application used to create a GUI, such as the GTK.

The method 211 may continue on to block 233 with determining whether the customization code and/or script are resident on the target machine. If not, the method 211 may include, at block 245, sending the access customization code and a script corresponding to the application from a central repository to the target machine(s) when the customization code is not resident on the target machine(s).

A history of target machine activity may be obtained for review, perhaps by the central manager. Thus, from block 245, the method 211 may continue on to block 249 to include obtaining action status data from the target machine(s) as a history of target machine activity.

The central manager may operate to verify compliance with the access requests that have been sent out to various target machines, perhaps by processing historic reports of target machine activity. Thus, the method 211 may continue on from block 233 to block 237 with verifying a correct response to the sending of the access request (e.g., determining from historic data that the application has indeed been accessed).

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of network-based application control shown in FIGS. 1 and 2 can be implemented in various devices, as well as in a computer-readable storage medium, where the methods are adapted to be executed by one or more processors. Further details of such embodiments will now be described.

Figure 3:
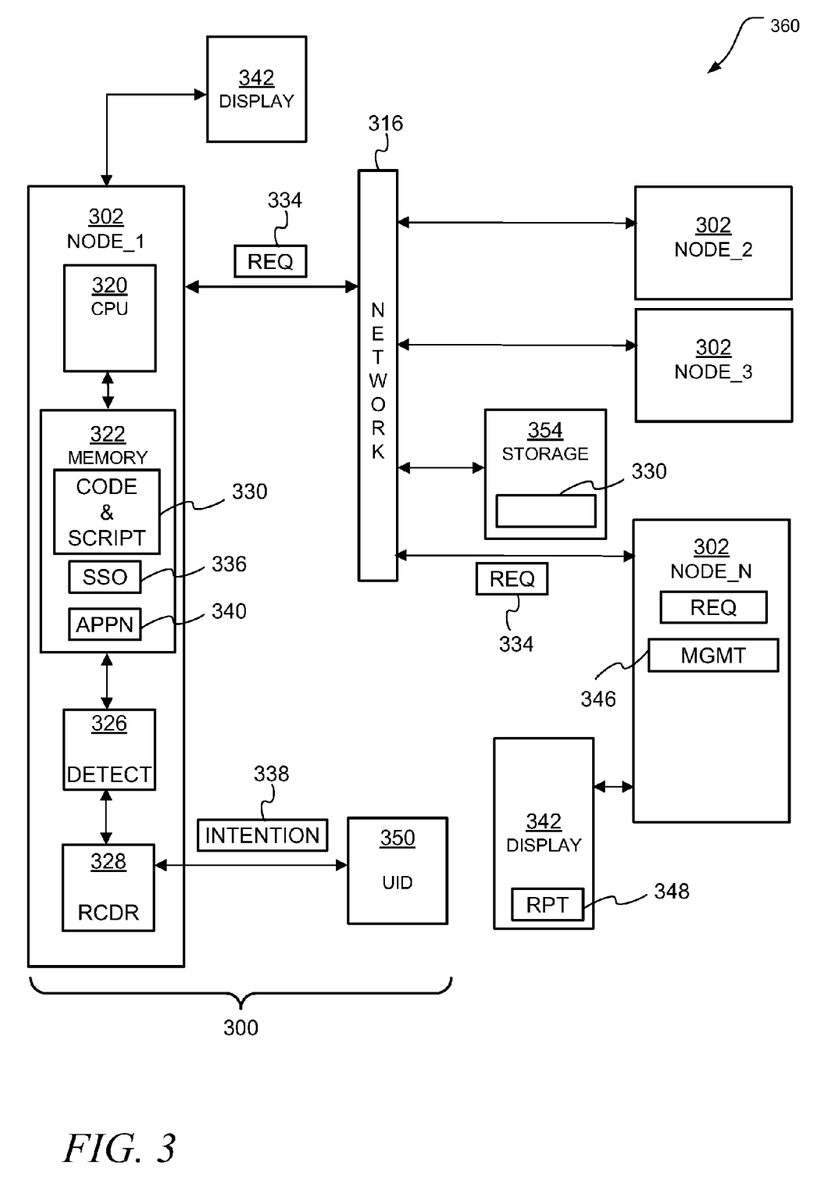
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement network-based application control may comprise one or more processing nodes 302, one or more processors 320, memory 322, a detection module 326, and a recording module 328.

The processing nodes 302 may comprise physical machines or virtual machines, or a mixture of both. The nodes 302 may also comprise networked entities, such servers and/or clients.

In some embodiments, then, an apparatus 300 may comprise a node 302 (e.g., NODE_1) including a detection module 326 to detect reception of an access request 334 from a central manager (e.g., NODE_N), the access request 334 being associated with an application 340 selected from a plurality of applications on the node 302. The apparatus 300 may further include one or more processors 320 to retrieve access customization code 330 corresponding to the application 340 from a central repository (e.g., storage 354) when the customization code 330 is not resident on the node (e.g., NODE_1), to load the access customization code 330 as a library linked to the application 340, and to replay recorded user intention input 338 according to a script 330 to supply the input 338 to objects associated with the application to access the application. The apparatus 300 may comprise a client, or some other networked processing node.

The node 302 (e.g., NODE_1) can be configured specifically to implement SSO operations. Thus, in some embodiments, the apparatus 300 may comprise a memory 322 to store an SSO enabler module 336 to couple to the processor 320. The SSO enabler module 336 may operate to detect and process access requests oriented primarily toward SSO access, rather than more general control access requests. For example, the enabler module 336 may be granted special access to credential storage when such is needed.

User intention input 338 at the node 302 can be captured by a recording module 328. Thus, the apparatus 300 may further comprise a recording module 328 to capture the user intention input 338 when SSO access has not been previously enabled for the application 340.

A user input device 350, such as a keyboard, touch screen, trackball, switch, photosensitive device, imager, microphone, mouse, etc. may be used to provide the user intention input 338. Thus, the apparatus 300 may comprise a user input device 350 to provide the intention input 338. Still further embodiments may be realized.

For example, it can be seen that a system 360 that operates to implement network-based application control may comprises multiple instances of the apparatus 300. The system 360 might also comprise a cluster of nodes 302, including physical and virtual nodes.

In some embodiments, the system 360 may utilize a server node (e.g., NODE_N) as the central manager, which operates to regulate the distribution of access customization code and scripts 330 to various target machines (e.g., nodes NODE_1, NODE_2, and NODE_3), according to requests 334 that have been sent out to the target machines. Thus, the system 360 may comprise a first node 302 (e.g., NODE_N) operating as a central manager comprising a central management module 346 to send, to at least one target machine, an access request 334 associated with an application 340 selected from a plurality of applications on the target machine. The access request 334 can be used to identify the target machine, the application 340, and access customization code 330 corresponding to the application.

The central management module 346 can be used to regulate sending access customization code and scripts 330 corresponding to the application 340 from a central repository (e.g., storage 354) to the target machines when the customization code 330 is not resident on the target machines. Thus, the system 360 may further include a processor 320 to retrieve the access customization code 330 from the central repository (e.g., storage 354), to load the access customization code 330 as a library linked to the application 340, and to replay recorded user intention input 338 according to a script 330 to supply the input 338 to objects associated with the application 340 to access the application 340.

In many embodiments, the system 360 comprises a second node (e.g., NODE_1) to operate as the target machine that includes a detection module 326 to detect reception of the access request 334. The system 360 may combine a server as the first node NODE_N, and a client as the second node NODE_1 in some cases.

The apparatus 300 and system 360 may also include a display 342 to view compliance reports. Thus, the system 360 may further comprise a display 342 coupled to the first node (e.g., NODE_N) to display a visible representation of reports 348 verifying correct response to the access request 334 by the target machine.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
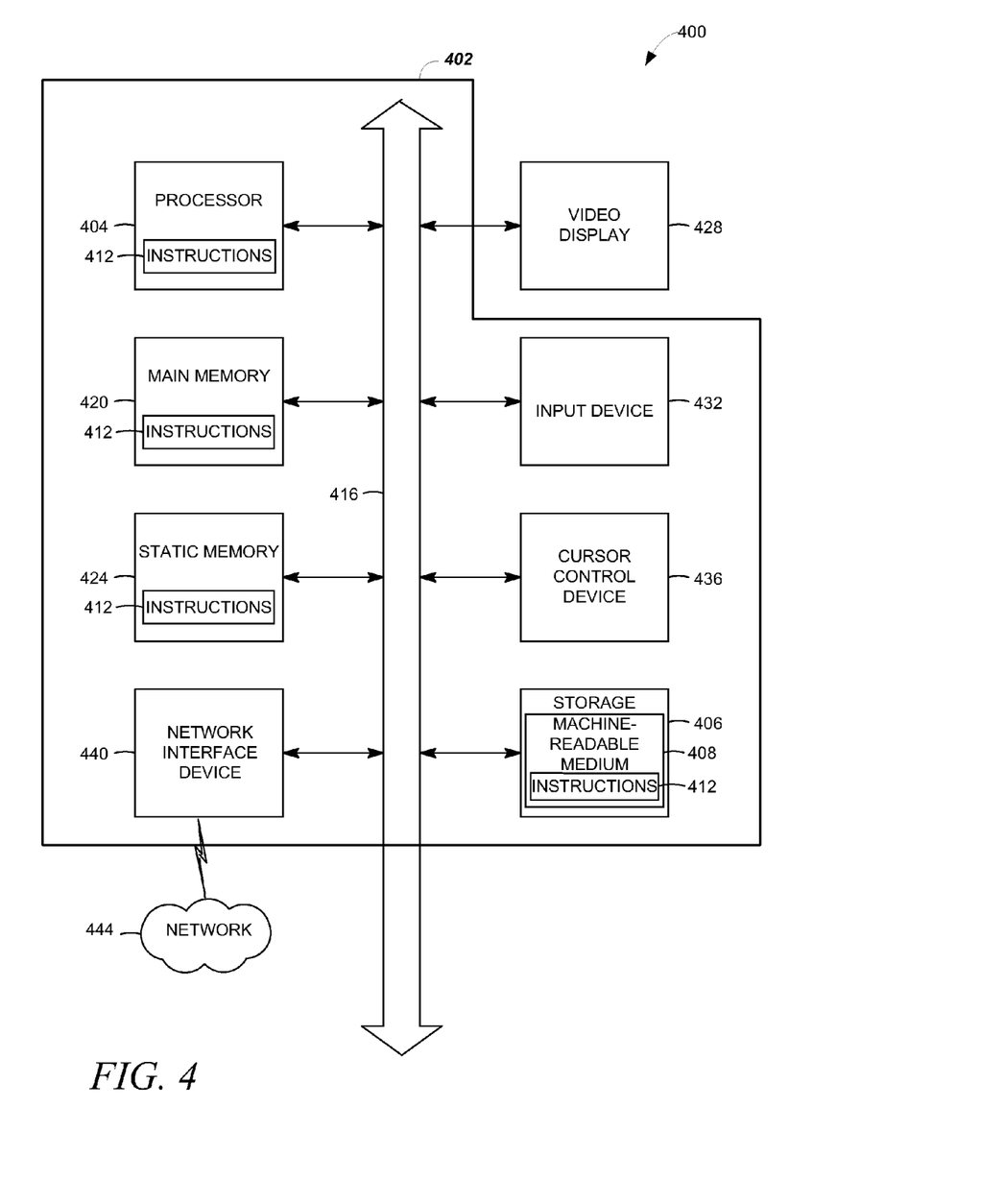
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to make application access more efficient across applications deployed within a framework of machines. The applications can be made available for SSO operations, as well as central management, testing, and control, without re-writing them. More efficient allocation of processing resources, and increased user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising: a node including a detection module to detect reception of an access request from a central manager, the access request associated with one application selected from a plurality of applications on the node remote from the central manager; and a processor to retrieve access customization code corresponding to the one application from a central repository when the customization code is not resident on the node, to retrieve a script from the central repository based on a script identity, to load the access customization code as a library, ahead of the other libraries for the target machine, linked to the one application, and to replay recorded user intention input according to the script to supply the input to objects associated with the one application to access the one application.

2. The apparatus of claim 1, further comprising:

a memory to store a single sign on (SSO) enabler module to couple to the processor.

3. The apparatus of claim 1, further comprising:

a recording module to capture the user intention input when single sign on (SSO) access has not been previously enabled for the one application.

4. A system, comprising: a first node comprising a central management module to send, to at least one target machine remote from the central manager, an access request associated with one application selected from a plurality of applications on the at least one target machine, the access request to identify the at least one target machine, the one application, and access customization code corresponding to the one application, and to regulate sending access customization code and the script corresponding to the one application from a central repository to the at least one target machine when the customization code is not resident on the at least one target machine; a second node to operate as the at least one target machine, the second node including a detection module to detect reception of the access request; and a processor to retrieve the access customization code from the central repository based on a script identity, to load the access customization code as a library, ahead of the other libraries for the at least one target machine, linked to the one application, and to replay recorded user intention input according to a script to supply the input to objects associated with the one application to access the one application.

5. The system of claim 4, further comprising:

a display coupled to the first node to display a visible representation of reports verifying correct response to the access request by the at least one target machine.

6. A processor-implemented method to execute on one or more processors that perform the method, comprising: receiving from a central manager, at a target machine remote from the central manager, an access request associated with one application selected from a plurality of applications on the target machine; retrieving access customization code corresponding to the one application from a central repository when the customization code is not resident on the target machine; retrieving a script from the central repository based on a script identity; restarting the target machine to load the access customization code as a library, ahead of other libraries for the one application on the target machine, linked to the one application; and replaying recorded user intention input according to the script to supply the input to objects associated with the one application to access the one application.

7. The method of claim 6, wherein the replaying comprises:

populating widget values associated with the one application using a script to enable single sign on (SSO) access to the one application.

8. The method of claim 6, further comprising:

recording the user intention input when single sign on (SSO) access has not been previously enabled fur the one application.

9. The method of claim 6, wherein the user intention input comprises a username and password.

10. The method of claim 6, further comprising:

retrieving the script corresponding to the one application from the central repository.

11. The method of claim 6, further comprising:
changing an environment variable on the target machine so that execution of the access customization code preempts execution of other library code on the target machine.

12. The method of claim 6, further comprising:
restarting the one application to load the access customization code according to a selected library loading order.

13. The method of claim 6, further comprising:
processing the access request to determine identity of at least one of the target machine, the one application, the access customization code, or the script.

14. The method of claim 6, wherein the access request identifies a subset of the plurality of applications, including the one application.

15. The method of claim 6, further comprising:
executing the access customization code on the target machine in response to the receiving when the customization code is resident on the target machine.

16. The method of claim 6, further comprising:
recording activities on the target machine associated with executing the one application to create a history of activities associated with the application in response to receiving the access request.

17. A processor-implemented method to execute on one or more processors that perform the method, comprising: sending, from a central manager to at least one target machine remote from the central manager, an access request associated with one application selected from a plurality of applications on the at least one target machine, the access request identifying the target machine, the one application, and access customization code corresponding to the one application; and sending access customization code and the script corresponding to the one application from a central repository to the at least one target machine when the customization code is not resident on the at least one target machine, wherein the script is retrieved from the central repository based on a script identity, and wherein the target machine is configured to be restarted to load the access customization code as a library, ahead of other libraries for the one application on the target machine, linked to the one application.

18. The method of claim 17, wherein the application comprises a widget-based application used to create graphical user interfaces.

19. The method of claim 17, further comprising:
initiating the sending of the access request in response to detecting a system administrator entry at the central manager.

20. The method of claim 19, wherein the system administrator entry comprises an automated test entry to remotely control the at least one target machine.

21. The method of claim 17, further comprising:
obtaining action status data from the at least one target machine as a history of target machine activity.

22. The method of claim 17, further comprising:
verifying a correct response to the sending of the access request.

* * * * *

UNITED STATES PATENT AND TRADEMARK OFFICE
CERTIFICATE OF CORRECTION

| | |
|---|---|
| PATENT NO. | : 8,375,429 B2 |
| APPLICATION NO. | : 12/421213 |
| DATED | : February 12, 2013 |
| INVENTOR(S) | : Joy Mondal |

It is certified that error appears in the above-identified patent and that said Letters Patent is hereby corrected as shown below:

On the Title Page

Item 56, in column 2, under "Other Publications", line 2, before "Considerations", insert --"--, therefor Item 56, in column 2, under "Other Publications", line 3, after "enterprise", insert --"--, therefor Item 56, in column 2, under "Other Publications", line 4, delete "al, Web" and insert --al., "Web--, therefor Item 56, in column 2, under "Other Publications", line 5, after "Architecture", insert --"--, therefor

Item 56, in column 2, under "Other Publications", line 6, delete "al, Muti" and insert --al., "Muti--, therefor Item 56, in column 2, under "Other Publications", line 7, after "System", insert --"--, therefor In the Claims In column 12, line 60, in Claim 8, delete "fur" and insert --for--, therefor Signed and Sealed this
Third Day of December, 2013

Margaret A. Focarino
*Commissioner for Patents of the United States Patent and Trademark Office*